May 14, 1957  G. E. HENNING  2,791,803
EXTRUDING APPARATUS

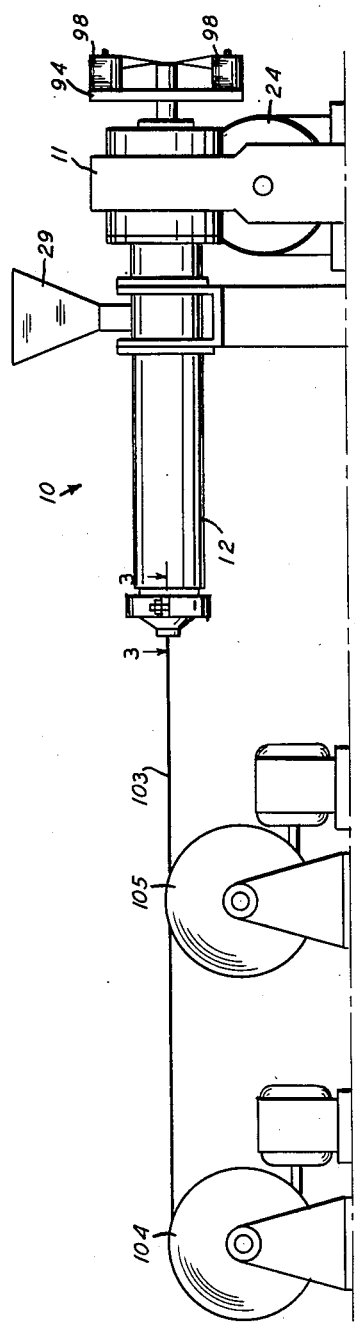

Filed Feb. 3, 1954  2 Sheets-Sheet 2

INVENTOR
G. E. HENNING
BY [signature]
ATTORNEY

United States Patent Office 2,791,803
Patented May 14, 1957

2,791,803

EXTRUDING APPARATUS

George E. Henning, Baltimore, Md., assignor to Western Electric Company, Incorporated, New York, N. Y., a corporation of New York Application February 3, 1954, Serial No. 407,873

4 Claims. (Cl. 18—13)

This invention relates to extruding apparatus, and more particularly to apparatus for plasticizing and straining plastic compounds as they are extruded into finished article form.

It has been proposed that insulated conductors be manufactured by extruding a plastic compound into a covering around a plurality of spaced, filamentary conductors which are continuously advanced longitudinally through a central bore formed in an extrusion screw. The extrusion screw is rotated continuously to force the plastic compound along a bore in an extrusion cylinder and into an extrusion head mounted at the exit end of the extrusion bore. It is desirable to strain the plastic compound as it is extruded to prevent flaws from appearing in the finished plastic insulating covering. Heretofore no satisfactory screen elements have been available for this particular type of extruding apparatus, which will not interfere with the passage of the continuously advancing conductors and yet will subject the entire flow of plastic compound to a screening action.

It is an object of this invention to provide new and improved extruding apparatus.

It is another object of this invention to provide new and improved apparatus for plasticizing and straining plastic compounds.

Apparatus illustrating certain features of the invention may include an improvement in apparatus for applying an extruded covering of a plastic compound upon a continuously advancing filamentary conductor including an extrusion cylinder having a central bore formed therein, an extrusion head positioned at the discharge end of the extrusion cylinder and an extrusion screw rotatably mounted within the bore for advancing a plastic compound through the bore and the extrusion head and having an axial bore extending longitudinally thereof for the passage of conductors therethrough, the improvement comprising a stationary straining element positioned adjacent to the extrusion head in the path of the plastic compound advanced by the extrusion screw and having a restricted central opening concentric with the bore in the extrusion screw, and a core tube mounted on the forward end of the extrusion screw for rotation therewith and having a portion adjacent to the restricted central opening in the straining element supporting the straining element as the plastic material is forced therethrough.

A complete understanding of the invention may be obtained from the following detailed description of an apparatus forming a specific embodiment thereof, when read in conjunction with the appended drawings, in which:

Fig. 1 is a side elevation of extrusion apparatus forming one embodiment of the invention;

Fig. 2 is an enlarged, fragmentary, vertical section of a portion of the apparatus taken along the longitudinal axis thereof, with parts thereof broken away for clarity;

Fig. 4 is an enlarged, fragmentary, vertical section taken along line 4—4 of Fig. 3;

Fig. 5 is an enlarged, vertical section taken along line 5—5 of Fig. 3, and

Fig. 6 is a sectional perspective view of portions of the apparatus adjacent to a forming die mounted in the extrusion head.

Figure 3:
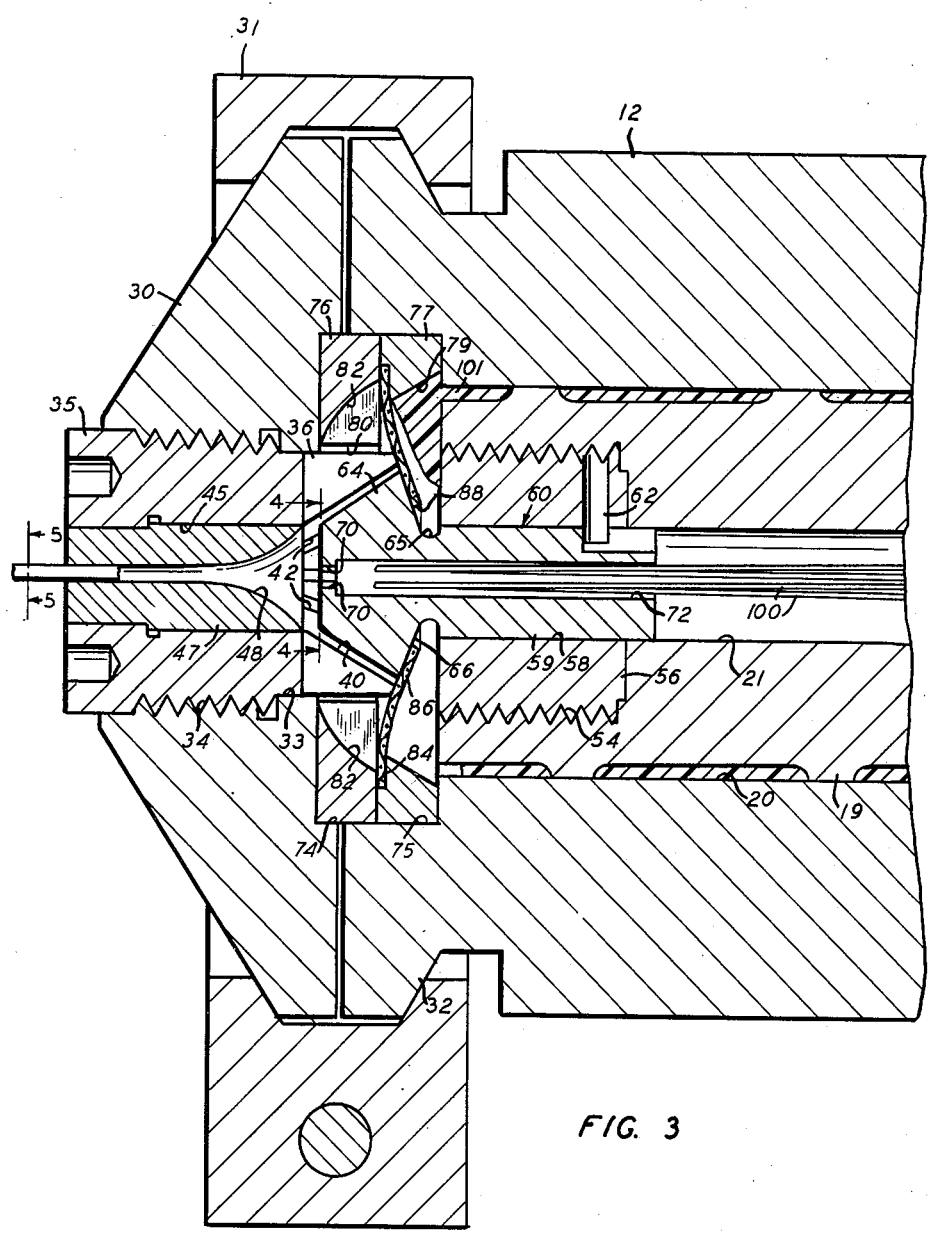
Fig. 3 is an enlarged, fragmentary, horizontal section taken along line 3—3 of Fig. 1.

Referring now to Fig. 1, there is shown extrusion apparatus for applying a common covering of an insulating compound on a plurality of spaced conductors to form an insulated, multiconductor wire. The extrusion apparatus includes a plastics extruder designated generally by the numeral 10, which comprises a supporting housing 11 and a horizontally extruding extrusion cylinder 12 secured thereto. Suitably journaled within the housing 11 in roller bearings 14 and 15 (Fig. 2), is a sleeve 17, within one end of which is keyed a shank 18 of a horizontally extending plasticizing and extruding screw 19. The screw 19 is mounted rotatably within an extrusion bore 20 formed in the extrusion cylinder 12, and is provided with an axial bore 21 through which conductors to be insulated may be advanced.

The screw 19 may be rotated continuously by means of a gear 22, which is keyed on the rotatable sleeve 17 and is rotated by a motor 24 and suitable reduction gearing (not shown). Communicating with the extrusion bore 20 of the extrusion cylinder 12 is an opening 26 (Fig. 2) through which a plastic insulating compound may be introduced from a hopper 29. The plastic compound is urged toward the forward end of the cylinder by the impeller action of the continuously rotating screw 19.

As shown in Fig. 3, a die head 30 is removably secured by means of a split clamping ring 31 to a flange 32 formed externally on the forward end of the extrusion cylinder 12. The die head 30 has a generally frustoconical exterior and is provided with a central bore 33 communicating with a threaded counterbore 34 formed therein. Threadedly received within the counterbore 34 is an externally threaded die holder 35 provided with an unthreaded shank 36 formed integrally therewith and received closely within the bore 33.

The shank portion 36 is provided with a central, frustoconical bore 40, the wall of which tapers at an angle of about 30° with respect to the longitudinal axis of the extrusion bore 20. A plurality of equally spaced slots 42—42 are formed in the free end of the shank portion 36 and extend radially from the frustoconical bore 40 to the outer periphery thereof. Formed in the die holder 35 and communicating with the frustoconical bore 40 is a shouldered bore 45 adapted to receive and retain an extrusion die 47 mounted concentrically therewithin in axial alignment with the longitudinal axis of the extrusion bore 20. The extrusion die 47 is provided with a bell-mouthed extrusion orifice 48 of desired cross section and size, which is concentric with the longitudinal axis of the extrusion bore 20.

As shown in Fig. 3, the forward end face of the screw 19 lies in a plane perpendicular to the longitudinal axis of the bore 20 and is spaced a short distance inwardly from the forward end of the extrusion cylinder 12. A threaded counterbore 54 is formed centrally in the forward end of the screw 19 and is adapted to receive a threaded core tube holder 56. The forward end face of the core tube holder 56 is designed to lie flush with the corresponding end face of the screw 19. The core tube holder 56 has a central bore 58 designed to receive the cylindrical shank 59 of a core tube designated generally by the numeral 60, which is fixedly secured therewithin by means of a suitable key 62 for rotation with the screw 19.

The core tube 60 has an enlarged projecting nose 64 which is joined to the shank 59 by a relatively short neck 65. The forward portion of the nose 64 is frustoconical in shape and is complementary to the frustoconical bore 40 in the shank portion 36 of the die holder 35 into which it extends. The frustoconical surface of the forward portion of the nose 64 is normally spaced a short distance from the slotted wall of the complementary, frustoconical bore 40. The amount of clearance between the nose 64 of the core tube 60 and the wall of the bore 40 may be varied within limits by adjusting the axial position of the threaded die holder 35 in the threaded counterbore 34 of the die head 30. A frustoconical inner shoulder 66 on the nose 64 tapers rearwardly at an angle of about 60° with respect to the longitudinal axis of the extrusion bore 20 from its intersection with the frustoconical forward portion of the nose in the plane of the maximum diameter to its intersection with the neck 65 formed integrally therewith.

The nose 64 of the core tube 60 is provided with a plurality of equally spaced, longitudinally extending passages 70—70 arranged equilaterally around and disposed equidistantly from the common longitudinal axis of the core tube and the screw 19. The passages 70—70 extend inwardly from the blunt forward face of the nose 64 of the core tube 60 to a common passage 72 of a greater diameter which extends the remaining length of the core tube to communicate with the axial bore 21 in the screw 19.

As shown in Fig. 3, the die head 30 is provided with a counterbore 74 formed in its inner face concentrically with respect to the longitudinal axis of the bore 33 and counterbore 34. Similarly, the forward end of the extrusion cylinder 12 is provided with a counterbore 75 of of equal diameter. When the die head 30 is mounted on the end of the extrusion cylinder 12, the counterbores 74 and 75 are aligned and serve to retain an annular backing plate 76 and an adapter sleeve 77 in abutting contact.

The adapter sleeve 77, which is provided with a concentric frustoconical bore 79, is received wholly within the counterbore 75 in the end of the extrusion cylinder 12. The backing plate 76 is received partially within the counterbore 74 and partially within the counterbore 75, thereby serving as a seal to prevent any of the plastic compound from escaping between the forward end face of the extrusion cylinder 12 and the inner face of the die head 30. As shown in Fig. 3, the annular backing plate 76 is provided with a central, cylindrical bore 80, the walls of which are relieved by a plurality of equally spaced, parallel, longitudinally extending, arcuate grooves 82—82, which provide channels for the flow of plastic compound. The backing plate 76 surrounds the slotted shank portion 36 of the die holder 35 concentrically.

Formed in the forward face of the adapter sleeve 77 is an annular recess 84 designed to receive the circular outer edge of a stationary, funnel-shaped screen-pack 86, which is held fixedly therewithin by the abutting face of the annular backing plate 76. The funnel-shaped screen-pack 86 is provided at its restricted end with a central circular opening 88 through which the neck 65 of the core tube 60 projects. Portions of the screen-pack 86 immediately adjacent to the opening 88 therein are supported slidably against the substantially complementary, frustoconical surface of the shoulder 66 on the nose 64 of the core tube 60.

Referring now to Fig. 2, a shaft 90 is received within the sleeve 17 and is provided with a threaded end 91 which is threadedly engaged within a complementary portion of the shank 18 of the screw 19 for rotation therewith. The shaft 90 projects a short distance beyond the sleeve 17 and the housing 11 and is provided with an axial passageway 93 which communicates with the axial bore 21 of the screw 19.

Mounted fixedly on the projecting outer end of the shaft 90 for rotation therewith, is a plate 94 which lies in a plane perpendicular to the rotational axis of the shaft. Mounted on the plate 94 are a plurality of equally spaced spindles 96—96 arranged equidistantly from the axis of the shaft 90. The spindles 96—96 are arranged to support supply spools 98—98 carrying lengths of filamentary conductors 100—100.

The conductors 100—100 are advanced from their respective supply spools 98—98 through the passageway 93 in the shaft 90, through the axial bore 21 in the screw 20, and thence individually through the respective passages 70—70 in the nose 64 of the core tube 60. Upon leaving the passages 70—70, the conductors 100—100 are enveloped by a mass 101 of plastic insulating compound and exit through the orifice 48 of the die 47 wherein there is produced a continuous insulating covering 102 of the plastic insulating compound to form an insulated multiconductor wire designated generally by the numeral 103 which is subsequently wound upon a suitable reel 104. A suitable takeup capstan 105 is positioned between the extruder 10 and the reel 104 for the purpose of advancing the conductors 100—100 continuously from their supply spools 98—98.

*Operation*

In the operation of the apparatus described hereinabove, the conductors 100—100 are advanced continuously from their individual supply spools 98—98 through the bore 21 in the extrusion screw 19, and thence individually through their respective passages 70—70 in the nose 64 of the core tube 60. The extrusion screw 19 is rotated continuously within the extrusion bore 20 of the extrusion cylinder 12 by means of the electric motor 24 operatively connected thereto. Plastic insulating compound is introduced into the extrusion bore 20 from the hopper 29 through the opening 26 and is urged forward through the extrusion bore by the impeller action of the rotating extrusion screw 19.

The mass 101 of plastic compound upon reaching the forward end of the extrusion screw 19 enters the constricting frustoconical bore 79 of the adapter sleeve 77, and thence passes entirely through the stationary, funnel-shaped screen-pack 86. The mass 101 of plastic compound, having been subjected to the straining action of the screen-pack 86, then enters the grooved, cylindrical bore 80 of the backing plate 76, and thence the bore 40, wherein it converges upon and envelopes the four, individual, equilaterally spaced conductors as they exit from the passages 70—70 in the core tube 60 forming a unitary conical stream as it enters the orifice of the die 47.

When the conductors leave the exit end of the die 47, they are completely enveloped in a common cylindrical covering 102 of solidified plastic insulating compound to form a multiconductor wire 103. The portions of the funnel-shaped screen-pack 86 adjacent to the central opening at the restricted end thereof are slidably supported by the complementary frustoconical inner shoulder 66 formed on the nose 64 of the core tube 60. The pressure of the flowing mass 101 of plastic compound urges these portions of the screen-pack 86 adjacent to the central opening therein tightly against the inner shoulder 66 of the rotating core tube 60 to prevent any leakage of the plastic compound therebetween. Thus, the entire mass 101 of plastic compound is subjected to the straining action of the screen-pack 86 prior to enveloping the conductors 100—100. It is manifest that the screen-pack 86 does not interfere with the free passage of the continuously advancing conductors 100—100, and, hence, the requisite straining of the plastic compound is obtained without interfering with the continuous advance of the conductors.

It will be understood that the above-described apparatus is merely illustrative of the application of the principles of the invention and that numerous modifications thereof may be made within the spirit and scope thereof. For example, the apparatus heretofore described may be readily modified to produce multiconductor wires of more or less than four conductors.

What is claimed is:

1. In apparatus for applying an extruded covering of a plastic compound upon an advancing filamentary conductor including an extruder having a bore formed therein, an extrusion head positioned at the discharge end of the extruder and an extrusion screw rotatably mounted within the bore for advancing a plastic compound through the bore and the extrusion head and having a bore extending longitudinally thereof for the passage of conductors therethrough, the improvement which comprises a stationary straining element positioned adjacent to the extrusion head in the path of the plastic compound advanced by the extrusion screw and having an opening therein, and a core tube mounted adjacent to the forward end of the extrusion screw for rotation and having a portion adjacent to the opening in the straining element supporting the straining element against the longitudinal thrust of the plastic compound being forced therethrough.

2. In apparatus for applying an extruded covering of a plastic compound upon an advancing filamentary conductor including an extruder having a bore formed therein, an extrusion head positioned at the discharge end of the extruder and an extrusion screw rotatably mounted within the bore for advancing a plastic compound through the bore and the extrusion head and having a bore extending longitudinally thereof for the passage of conductors therethrough, the improvement which comprises a stationary straining element positioned adjacent to the extrusion head in the path of the plastic compound advanced by the extrusion screw and having an opening therein, and a core tube mounted adjacent to the forward end of the extrusion screw for rotation and having a forward portion projecting through the opening in the straining element, said forward portion of the core tube having a surface portion complementary to portions of said straining element adjacent to the opening therein for slidably supporting the straining element against the longitudinal thrust of the plastic compound being forced therethrough.

3. In apparatus for applying an extruded covering of a plastic compound upon an advancing filamentary conductor including an extruder having a bore formed therein, an extrusion head positioned at the discharge end of the extruder and an extrusion screw rotatably mounted within the bore for advancing a plastic compound through the bore and the extrusion head and having a bore extending longitudinally thereof for the passage of conductors therethrough, the improvement which comprises a stationary funnel-shaped straining element positioned adjacent to the extrusion head in the path of the plastic compound advanced by the extrusion screw and having a restricted opening therein, and a core tube mounted adjacent to the forward end of the extrusion screw for rotation and having a projecting nose portion extending through the restricted opening in the straining element, said nose portion of the core tube having a substantially frustoconical shoulder portion complementary to portions of the straining element adjacent to said opening therein for slidably supporting the straining element against the longitudinal thrust of the plastic compound being forced therethrough.

4. In apparatus for applying an extruded covering of a plastic compound upon an advancing filamentary conductor including an extruder having a bore formed therein, an extrusion head positioned at the discharge end of the extruder and an extrusion screw rotatably mounted within the bore for advancing a plastic compound through the bore and the extrusion head and having a bore extending longitudinally thereof for the passage of conductors therethrough, the improvement which comprises a stationary funnel-shaped screen positioned adjacent to the extrusion head in the path of the plastic compound advanced by the extrusion screw and having an opening therein, a core tube mounted adjacent to the forward end of the extrusion screw and having a projecting nose portion extending axially from the forward end of the screw concentrically through the opening in the restricted end of the funnel-shaped screen and having a shoulder formed thereon which is substantially complementary to portions of the screen adjacent to the opening therein for slidably supporting the straining element against the longitudinal thrust of the plastic compound being forced therethrough, and an annular backing plate provided with radially extending rib portions for fixedly supporting portions of the screen adjacent to the diverging end thereof.

References Cited in the file of this patent

UNITED STATES PATENTS

| | | |
|---|---|---|
| 1,726,359 | Martell et al. | Aug. 27, 1929 |
| 2,096,347 | Short | Oct. 19, 1937 |

FOREIGN PATENTS

| | | |
|---|---|---|
| 27,898 | Netherlands | Sept. 15, 1932 |